United States Patent
Kibsgaard et al.

(10) Patent No.: US 10,378,515 B2
(45) Date of Patent: Aug. 13, 2019

(54) WIND TURBINE CONTROL

(71) Applicant: STATOIL PETROLEUM AS, Stavanger (NO)

(72) Inventors: Svend Tarald Kibsgaard, Porsgrunn (NO); Jone Torsvik, Søreidgrend (NO); Lars Brenne, Sandnes (NO)

(73) Assignee: STATOIL PETROLEUM AS, Stavanger (NO)

( * ) Notice: Subject to any disclaimer, the term of this patent is extended or adjusted under 35 U.S.C. 154(b) by 464 days.

(21) Appl. No.: 14/896,625

(22) PCT Filed: Jun. 5, 2014

(86) PCT No.: PCT/EP2014/061751
§ 371 (c)(1),
(2) Date: Dec. 7, 2015

(87) PCT Pub. No.: WO2014/195428
PCT Pub. Date: Dec. 11, 2014

(65) Prior Publication Data
US 2016/0123304 A1    May 5, 2016

(30) Foreign Application Priority Data

Jun. 7, 2013  (GB) .................................. 1310210.8

(51) Int. Cl.
| | |
|---|---|
| *F03D 17/00* | (2016.01) |
| *F03D 7/04* | (2006.01) |
| *F03D 7/02* | (2006.01) |
| *F03D 80/70* | (2016.01) |
| *F03D 1/06* | (2006.01) |
| *G05B 15/02* | (2006.01) |

(52) U.S. Cl.
CPC ............ *F03D 7/047* (2013.01); *F03D 1/0675* (2013.01); *F03D 7/0224* (2013.01); *F03D 17/00* (2016.05); *F03D 80/70* (2016.05); *G05B 15/02* (2013.01); *F16C 2360/31* (2013.01); *Y02E 10/721* (2013.01); *Y02E 10/723* (2013.01)

(58) Field of Classification Search
None
See application file for complete search history.

(56) References Cited

U.S. PATENT DOCUMENTS

| | | |
|---|---|---|
| 2007/0294049 A1 | 12/2007 | Pierce et al. |
| 2008/0159674 A1 | 7/2008 | Varonis |
| 2009/0035136 A1 | 2/2009 | Pierce et al. |

(Continued)

FOREIGN PATENT DOCUMENTS

| | | |
|---|---|---|
| JP | 9-61268 A | 3/1997 |
| JP | 2006-177268 A | 7/2006 |

(Continued)

*Primary Examiner* — Jason D Shanske
*Assistant Examiner* — Theodore C Ribadeneyra
(74) *Attorney, Agent, or Firm* — Birch, Stewart, Kolasch & Birch, LLP

(57) ABSTRACT

A method of dynamically controlling a wind turbine having a rotor supporting a plurality of blades and a main bearing supporting the rotor, the method comprising detecting a load profile around the circumference of the main bearing, generating a control signal based on the detected load profile and dynamically adjusting the load profile of the main bearing using the control signal.

10 Claims, 3 Drawing Sheets

(56) References Cited

U.S. PATENT DOCUMENTS

| | | |
|---|---|---|
| 2010/0014971 A1 | 1/2010 | Risager et al. |
| 2011/0206512 A1* | 8/2011 | Hedges ................. F03D 1/0658 416/61 |
| 2012/0070280 A1 | 3/2012 | Wadehn |

FOREIGN PATENT DOCUMENTS

| | | |
|---|---|---|
| JP | 2008-528911 A | 7/2008 |
| JP | 2009-2447 A | 1/2009 |
| JP | 2010-159710 A | 7/2010 |
| JP | 2013-513090 A | 4/2013 |
| WO | WO 2008/119351 A2 | 10/2008 |

* cited by examiner

WIND TURBINE CONTROL

TECHNICAL FIELD

The invention relates to the field of wind turbines.

BACKGROUND

Wind turbines are an established means for generating electricity. A wind turbine generally comprises a rotor supporting a plurality of blades. The rotor is arranged to drive a generator directly or via a gear box. In a horizontal axis turbine, the rotor and the housing of the generator (the housing is also called a nacelle) are supported by a tower. The up-wind type where the blades face into the wind is most common. A yaw system keeps the orientation of the rotor and the blades within allowable limits relative to the wind direction. The turbine control system is controlling the rotor speed and power by pitching the blades. Yaw and pitch motions are commonly powered by geared electric motors. Hydraulic cylinders are also commonly used for powering pitch motion. Ultrasonic or mechanical instruments for measuring wind speed and direction are placed on top of the nacelle. For large wind turbines, the wind flow may not be uniform across all of the rotor-swept area and the ability to pitch the blades individually is therefore common.

The rotor is supported by bearings, which are usually rolling element bearings and are sometimes also referred to as low friction bearings. For large wind turbines, there is a trend towards using large-diameter slim-profile bearings. The large-diameter slim-profile bearings are arranged coaxially and are spaced closely together. The bearings may also be combined in one single bearing unit. The result is a compact design with a high bending- and torsional stiffness. The use of large-diameter slim-profile bearings puts more complex requirements on the design and stiffness of the adjoining components, when compared to conventional, smaller wind turbine designs.

The rolling elements are preferably kept under sufficient contact forces to ensure rolling contact with the bearing races. Loss of contact forces could cause the rollers to start skidding against the bearing races, which would be detrimental. Maintaining contact forces is achieved through imposing a high pre-loading of the bearings during the assembly and installation process of the bearings. The pre-loading ensures a minimum initial contact force between the stationary part of the bearing, the rolling elements and the rotary part of the bearing. The pre-loading also avoids excess localised contact forces within the bearing after the rotor and blades are attached to the bearing. The contact forces between rollers and races resulting from the combination of the bearing pre-loading and the external forces from operation present design constraints of the bearing. Flexing of the slim-profile large-diameter bearings under operation can cause an uneven load profile around the diameter of the bearing. Furthermore, wear of the rollers and races will reduce the initial pre-loading over time. Global and spatial variations in contact forces will be measurable as variations in strain in the bearing races.

SUMMARY

According to a first aspect, there is provided a method of dynamically controlling a wind turbine having a rotor supporting a plurality of blades and a main bearing supporting the rotor, the method comprising detecting a load profile around the circumference of the main bearing, generating a control signal based on the detected load profile, and dynamically adjusting the load profile of the main bearing using the control signal.

Detecting the load profile may comprise detecting strain at a plurality of locations around the bearing by means of a fibre optic sensor. The method may further comprise detecting the temperature of the bearing and dynamically adjusting the load in response to the detected load profile in combination with the detected temperature.

Dynamically adjusting the load profile may comprise adjusting the orientation of the blades of the wind turbine in response to the detected load profile and, optionally, adjusting the orientation of the blades may comprise adjusting the pitch angle of the blades or adjusting the yaw system. Adjusting the pre-loading profile may comprise applying a force onto the bearing additional to the force applied by the rotor.

The method may further comprise storing the detected load profile on the bearing in a memory for monitoring the condition of the bearing and, optionally, monitoring the condition of the wind turbine using the detected load profile.

The step of dynamically adjusting the load profile of the main bearing may involve a closed loop control process using the detected load profile as an input.

According to a second aspect, there is provided an active control assembly for controlling a wind turbine having a rotor supporting a plurality of blades and a main bearing rotatably coupling the rotor to a housing, the active control assembly comprising a detector arranged to detect a load profile of the main bearing, a processor arranged to determine a required adjustment of the blades in response to the detected load profile of the main bearing and arranged to generate a control signal, and an actuation mechanism for receiving the control signal and arranged to adjust the load profile depending on the control signal.

The active control assembly may further comprise a temperature sensor arranged to detect the temperature profile of the main bearing. The detector may comprise a fibre optic sensor. The fibre optic sensor may comprise a Bragg grating. The fibre optic sensor may have an outer diameter of substantially 125 µm. The fibre optic sensor may be embedded into a stationary race of the main bearing. The actuation mechanism may be arranged to adjust the pitch angle of the blades.

The actuation mechanism may comprise at least one piston arranged to apply a force onto the main bearing additional to the force applied by the rotor. The main bearing may be a slim-profile large-diameter rolling element bearing.

According to a third aspect, there is provided a wind turbine comprising an active control assembly as described above.

According to a fourth aspect, there is provided a computer device comprising a receiver for receiving a detected load profile of a main bearing of a wind turbine, a processor for determining a control signal for adjusting the load profile, and a transmitter for sending instructions to dynamically adjust the load profile of the main bearing.

According to a fifth aspect, there is provided a computer program comprising non-transitory computer readable code which, when run on a computer device, causes the computer device to behave as a computer device as described above.

According to a sixth aspect, there is provided a computer program product comprising a non-transitory computer readable medium and a computer program as described above, wherein the computer program is stored on the non-transitory computer readable medium.

DETAILED DESCRIPTION

Figure 1:
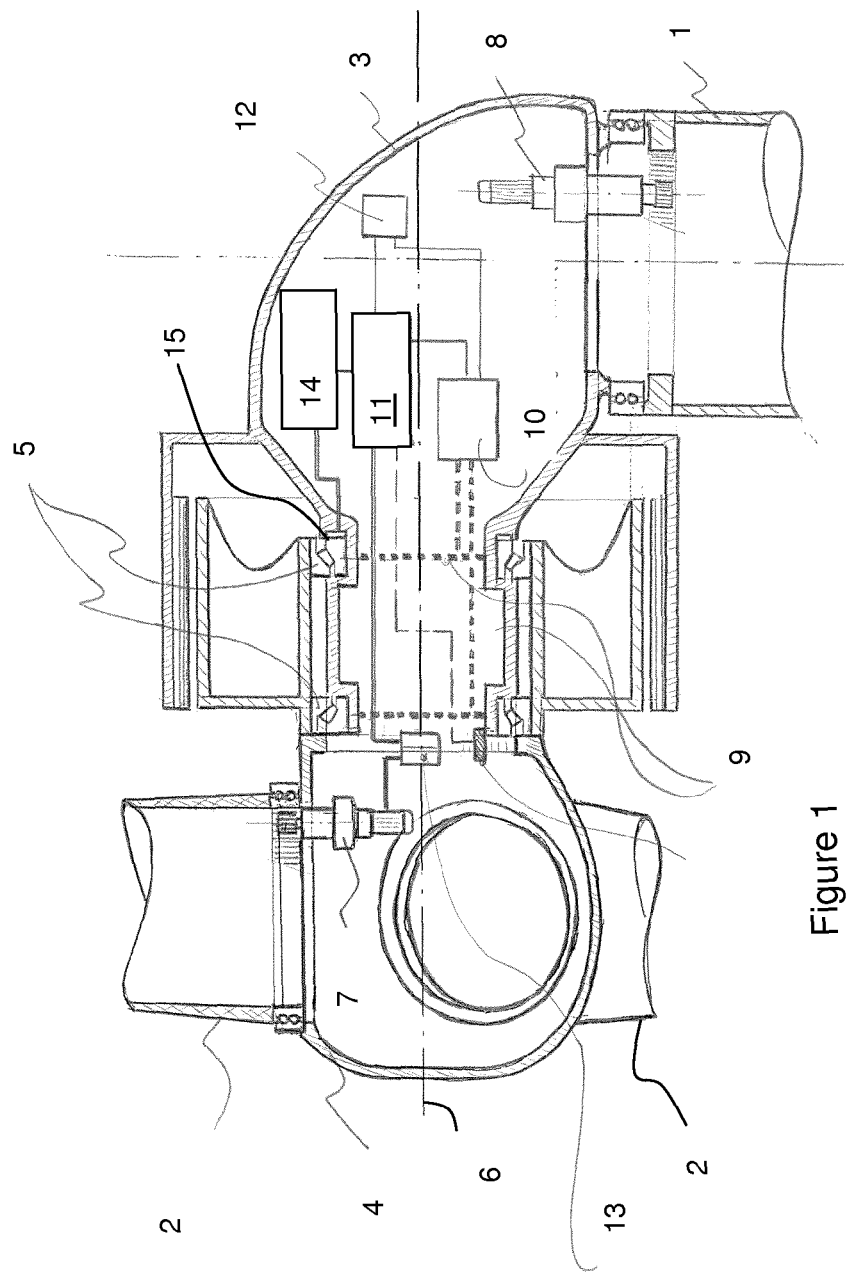
FIG. 1 illustrates schematically a vertical cross section of a wind turbine.

A wind turbine generally comprises a rotor supporting a plurality of blades. The rotor is arranged to drive a generator directly or via a gear box. A stationary tower supports the assembly of the blades, the rotor, the generator and the drivetrain. The blades are preferably facing the wind direction such that the plane defined by the blades is perpendicular to the wind direction. The orientation of the rotor and the blades with respect to the stationary tower is controlled by a yaw mechanism. The turbine control system controls the rotor speed by pitching the blades.

The rotor is supported by bearings. For large wind turbines, large-diameter slim-profile bearings may be used. A pre-loading of the bearings may be set during production of the bearings. The pre-loading avoids loss off contact forces between the stationary part of the bearing, the rolling elements and the rotary part of the bearing. The pre-loading also avoids excess localised contact forces within the bearing after the rotor and the blades are attached to the bearing.

The load profile of a bearing may be dynamically controlled by measuring the load profile of the bearing around the circumference of the bearing, by then generating a control signal based on the detected load profile and by dynamically adjusting the load profile of the bearing using the control signal.

The measurements may be collected by means of an optical fibre embedded into the stationary part of the bearing or otherwise secured to the stationary part of the bearing. The fibre preferably surrounds the entire bearing. Strain measurements on a roller bearing are described in "Monitoring Roller Bearings with Fiber Optic Sensors" by Lars Hoffmann et al. (Technisches Messen 74 (2007) 4, pages 204 to 210). The optical fibre may comprise one or more Bragg gratings. When light propagates though the fibre, some wavelengths will be reflected by the Bragg gratings, while other wavelengths will be transmitted. When strain is applied to a region of the fibre, the refractive index will change in the region where the strain is applied and this change can be detected by a shift in the wavelengths of the reflected and transmitted light. A plurality of Bragg gratings may be used within one optical fibre such that the strain of the bearing can be measured at a plurality of locations around the circumference of the bearing. The plurality of strain measurements can be used to estimate the load profile. A plurality of fibres may be used for increasing the set of measurements.

Alternatively, conventional strain gauges other than optical fibres may be used for determining the load profile.

A fibre Bragg grating sensor is also sensitive to temperature because the optical properties of the fibre are dependent on the temperature of the fibre. In addition to measuring strain at a plurality of locations, the temperature of the bearing at a plurality of locations may be determined by the fibre Bragg grating. The strain and temperature around the circumference of the bearing are dependent on one another.

For example, a larger temperature increase in the outer race than in the inner race under operation will reduce the pre-load due to the relatively larger thermal expansion of the outer race. A large temperature gradient may give rise to deformations of the material of the bearing which will lead to a change in the load profile of the bearing. Instead of using an optical fibre for determining the temperature, other temperature gauges may be used for determining the temperature.

The pitch angle of the blades may be adjusted depending on the measured load profile around the circumference of the bearing. A change of the pitch angle of the blades will change the load from the blades onto the rotor and thereby the load profile of the bearing. Besides the pitch angle of the blades, the yaw angle may also be adjusted. As a result of the adjustments made to the blades, the load profile within the bearing will change.

Actuators may be provided within the bearing or adjacent to the bearing such that the load profile of the bearing can be adjusted directly depending on the measured load profile. For example, one or more hydraulic pistons may apply a uniform pressure around the circumference of the bearing or may apply a local pressure to a specific region of the bearing. These direct actuators for adjusting the load profile may be used in addition to, or instead of the indirect controls provided by adjusting the blade pitch angle or the yaw angle.

A closed loop control process may be used, whereby the aim of the process is maintaining a particular load profile around the circumference of the bearing. The input to a closed loop control algorithm is the estimated load profile of the bearing. The output of the closed loop control algorithm is a control signal which may be combined with the speed and power control functions of the turbine for adjusting the blade pitch angle or which may be sent to the direct actuators.

Dynamic control of the load profile of the bearing is particularly relevant in a large bearing, such as a large-diameter slim-profile bearing, because the variation of load around the circumference of the bearing will be larger in a large bearing when compared to a small bearing.

Temperature measurements may be an additional input to the closed loop control process. A control process may compensate for an uneven temperature along the circumference of the bearing or at least to avoid overheating of the bearing. The load profile of a bearing and the temperature of the bearing are generally not independent of one another and a control process will take a dependency into account for ensuring a stable control process.

The measurements of the load profile also enable monitoring of the long term condition or detection of emerging failures. Changes to baseline behaviour of the bearing can be used to automatically notify the operator or trigger an alarm. Further, control parameters may be set depending on the long term condition or deviation from a baseline behaviour, triggering automated adaption in the control system in the form of a different control strategy or operating mode. For example, the optical fibre sensor may detect an emerging failure in the bearing and the control method may then automatically de-rate the turbine to reduce the rate of failure progression and thus increase the operability and reduce the likelihood of complete failure of the bearing or damage to other parts of the wind turbine.

The control system may be provided locally within the wind turbine, or remote monitoring of the control parameters and the condition of the bearing may be provided.

FIG. 1 illustrates schematically a vertical cross section of a wind turbine. A tower (1) supports an assembly including blades (2) and a main frame (3). The blades (2) extend radially outwardly from a hub (4) which is supported by main bearings (5). The bearings are large diameter roller bearings. The main bearings (5) may be arranged as two separate bearings which are oriented co-axially or the main bearings may be provided as a single combined unit of two bearings. The stationary portion of the bearings is attached to a main frame (3) and the rotary part of the bearings is attached to the hub and the blades. The axis of rotation of the hub coincides with the axis of the bearings and is indicated by line 6 in FIG. 1. A pitch actuator (7) is provided for each blade for adjusting the pitch of the blades. The orientation of the main frame with respect to the tower is controlled by a yaw mechanism (8).

Figure 2:
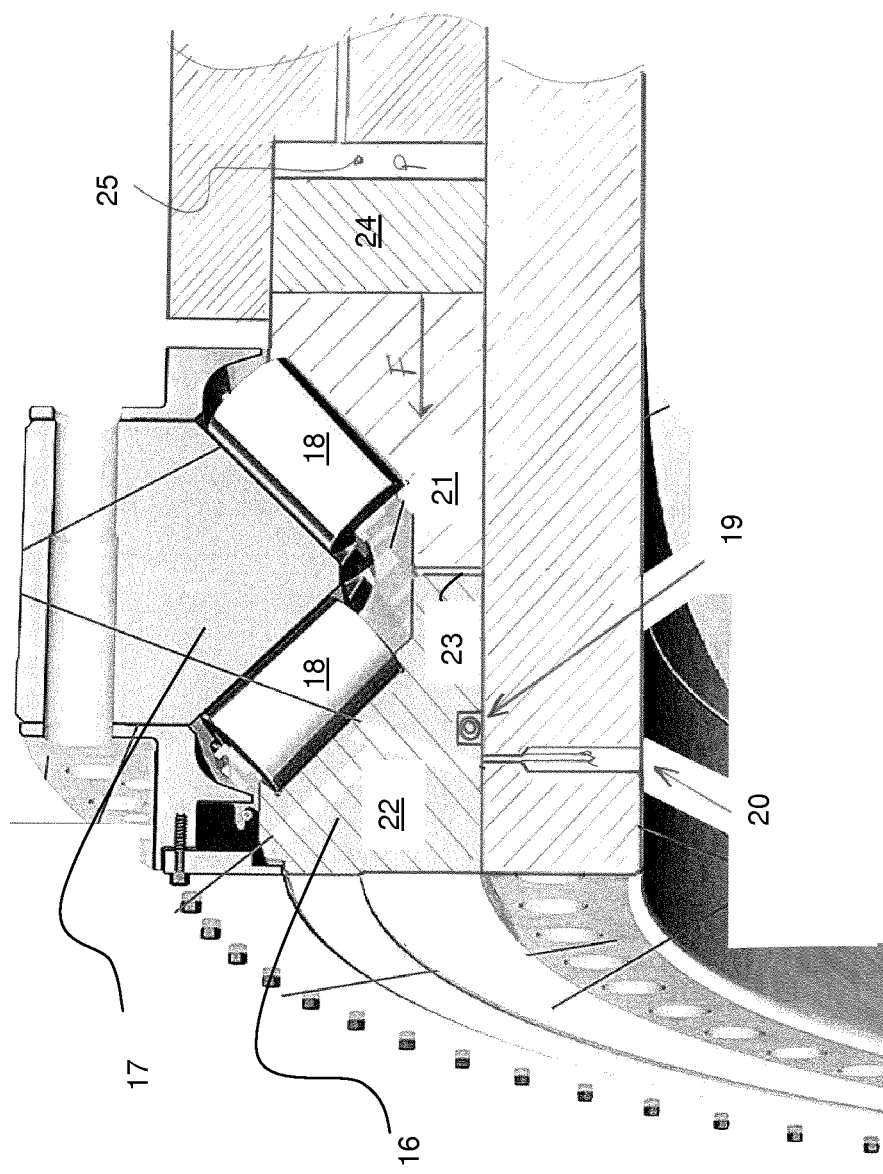
FIG. 2 illustrates schematically a vertical cross section of a bearing.

The load profile is measured along the circumference of the bearings (5) by strain gauges. The strain gauges are not illustrated in FIG. 1, but they are illustrated in FIG. 2. The output of the strain sensors is illustrated as lines 9 in FIG. 1 and the output is fed into a fibre Bragg grating interrogator or signal amplifier (10). The combination of the strain measurements forms the load profile. The output of the interrogator or amplifier (10) is coupled to a turbine controller (11). The output may also be coupled to a data storage and condition monitoring device (12). The data storage and condition monitoring device is arranged to monitor the long term condition of the wind turbine using the strain measurements. The data storage and condition monitoring device (12) may also collect data from the turbine controller (11). The turbine controller generates a control signal which depends on the load profile. The control signal is sent to the pitch actuator system (7). A cable carrying the control signal is connected between the turbine controller and the pitch drive via a rotable or wireless connection (13). For example, a slip ring or a swivel arrangement may be used as a rotatable connection such that the cable does not get entangled during rotation of the rotor. The direct actuation device may consist of a module (14) providing hydraulic or electric power to the actuators (15) which directly apply a force onto the bearings. The pitch actuator system and the direct actuators are used by the turbine controller to steer the load profile towards a desired profile set within a closed loop control process implemented within the turbine controller (11).

By way of example, the load profile of a large diameter bearing may be estimated by measuring the load at about 15 to 20 positions evenly distributed along the circumference of the bearing with an optical fibre. When two optical fibres are used, the number of measured positions may be more, for example 30. The load in between the measured positions can be estimated by interpolating the data, such as by taking the average value of the measured load at two adjacent positions. In this way, a continuous profile of the load at each position along the bearing at a certain time will be estimated. This load profile can be interpreted by software or can be visually represented for interpretation by an operator such that even small imbalances in the load can be detected. A continuous load profile is thereby estimated along the circumference of the bearing.

FIG. 2 illustrates schematically a vertical cross section through a bearing with strain gauges and an actuator. The bearing has an inner race (16) which is the stationary part when used in the wind turbine illustrated in FIG. 1. The bearing has an outer race (17) which is the rotary part. The outer race is rotatably supported by the inner race via rolling elements (18). In the vertical plane, the inside of the outer race (17) facing the axis of the bearing generally has a V-shape. In this example, two roller bearings in a so called "O"-configuration are combined in one single bearing unit. Two sets of rolling elements (18) respectively engage both sides of the V-shaped tapered portion of the outer race. Two strain sensors are illustrated: an optical fibre (19) with multiple Bragg grating sensors. The optical fibre is placed in a groove in the bearing race and attached to the material of the race such that a strain in the race can be transferred to the fibre and can be detected by the Bragg gratings. Alternatively, multiple strain gauges (20) can be positioned equidistantly along the inner race of the bearing. Although FIG. 2 illustrates both an optical fibre (19) and a strain gauge (20), only one of the two measurement systems may be used in a specific embodiment. The inner race (16) comprises two parts (21, 22) separated by a gap (23). Each one of the two parts engages with one of the two sets of rolling elements (18). The two parts of the inner race together form a V-shape which generally corresponds to the V-shape of the outer race. The two parts can be forced together by a force indicated by the arrow "F" in FIG. 2. This force can be used to adjust the load profile of the bearing. The force is applied by a block (24) driven by a hydraulic pressure in a space (25) behind the block (24). The block is movable in the direction indicated by the arrow F in FIG. 2 parallel to the rotation axis of the bearing. The block and the space (25) thereby form a piston. A single annular piston may be provided around the entire circumference of the bearing, or a plurality of pistons may be provided around the circumference of the bearing. The piston is used to adjust the load profile depending on the estimated load profile.

Figure 3:
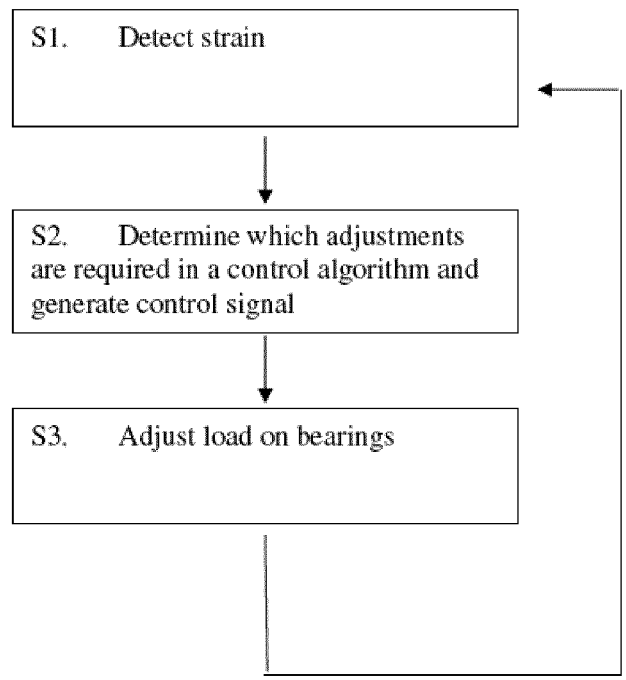
FIG. 3 is a flow diagram showing exemplary steps for controlling the pre-loading profile in a bearing.

FIG. 3 is a flow diagram showing exemplary steps for actively controlling a load profile in a bearing. The following numbering corresponds to that of FIG. 3:

S1. The optical fibre sensors measure the load profile in the bearing at a plurality of locations around the circumference of the bearing.

S2. The measured load profile is sent as an input to the control algorithm, which generates a control signal depending on the input.

S3. The control algorithm sends a signal to actuators for adjusting the load profile.

S1. The control process will continuously monitor the load profile while the blades are adjusted, thereby returning to step S1.

Figure 4:
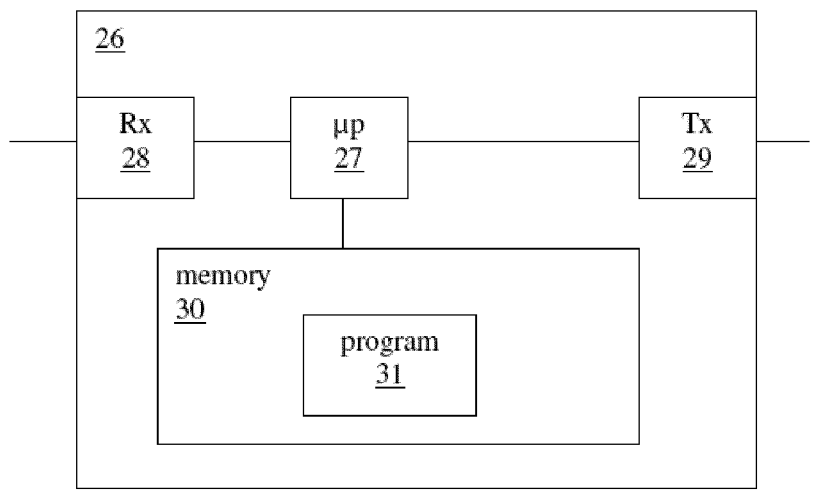
FIG. 4 illustrates schematically in a block diagram an exemplary computer device.

FIG. 4 illustrates schematically in a block diagram a computer device (26) that is arranged to control the load profile in the bearing. The computer device is provided with a processor (27) and a receiver (28) for receiving signals from optical fibre sensors to determine whether the blade pitch requires adjustment. On the basis of the received measurements, the processor determines how to adjust the pitch to correct the load profile. A transmitter (29) is provided for sending signals to actuators that control the blade pitch.

A non-transitory computer readable medium in the form of a memory (30) may also be provided that can be used to store data. It may also be used to store a computer program (31) which, when executed by the processor, causes the computer device to behave as described above.

It will be appreciated by a person of skill in the art that various modifications may be made to the above described embodiments without departing from the scope of the present disclosure. Different embodiments have been described above, but the skilled person will readily be able to devise other options for adjusting the load profile of the bearing in response to a detected load profile.

The invention claimed is:

1. A method of dynamically controlling a wind turbine having a rotor supporting a plurality of blades and a main bearing supporting the rotor, the method comprising:

detecting a load profile around the circumference of the main bearing, wherein detecting the load profile comprises detecting strain at a plurality of locations around the circumference of the bearing, and estimating a continuous load profile around the circumference of the bearing;

generating a control signal based on the detected load profile; and dynamically adjusting the load profile of the main bearing using the control signal.

2. The method of claim 1, wherein the strain is detected at the plurality of locations along the circumference of the bearing by means of a fibre optic sensor.

3. The method of claim 1, wherein the method further comprises detecting the temperature of the bearing and dynamically adjusting the load in response to the detected load profile in combination with the detected temperature.

4. The method of claim 1, wherein dynamically adjusting the load profile comprises adjusting the orientation of the blades of the wind turbine in response to the detected load profile.

5. The method of claim 4, wherein adjusting the orientation of the blades comprises adjusting the pitch angle of the blades.

6. The method of claim 4, wherein adjusting the blades comprises adjusting the yaw system.

7. The method of claim 1, wherein adjusting the preloading profile comprises applying a force onto the bearing additional to the force applied by the rotor.

8. The method of claim 1, further comprising storing the detected load profile on the bearing in a memory for monitoring the condition of the bearing.

9. The method of claim 1, further comprising monitoring the condition of the wind turbine using the detected load profile.

10. The method of claim 1, wherein the step of dynamically adjusting the load profile of the main bearing involves a closed loop control process using the detected load profile as an input.

* * * * *